United States Patent [19]

McWilliam

[11] Patent Number: 5,059,221

[45] Date of Patent: Oct. 22, 1991

[54] INTEGRATED AIR CLEANER ASSEMBLY

[75] Inventor: Richard D. McWilliam, West Lorne, Canada

[73] Assignee: Siemens-Bendix Automotive Electronics Limited, Chatham, Canada

[21] Appl. No.: 548,448

[22] Filed: Jul. 5, 1990

Related U.S. Application Data

[63] Continuation of Ser. No. 395,164, Aug. 15, 1989, abandoned, and a continuation of Ser. No. 226,267, Jul. 29, 1988, abandoned.

[51] Int. Cl.[5] .................. B01D 39/18

[52] U.S. Cl. .................. 55/276; 55/497; 55/510; 123/198 E

[58] Field of Search .................. 55/276, 497, 306, 510; 123/198 E

[56] References Cited

U.S. PATENT DOCUMENTS 4,713,097 12/1987 Grawi et al. .................. 55/276

4,790,864 12/1988 Kostun .................. 55/276

*Primary Examiner*—Charles Hart

*Attorney, Agent, or Firm*—George L. Boller; Russel C. Wells

[57] ABSTRACT

A filter assembly comprising: first and second compartments, the first compartment comprising an exit tube, the second compartment comprising an air inlet the exit tube comprises a plurality of radial inwardly extending stand-offs; an air flow sensor for sensing the mass of air exiting the exit tube, including an exit conduit adapted to be received upon and supported by the stand-offs; the exit conduit and exit tube cooperating to form a tuner inlet passage, the air flow sensor further including an entrance conduit, positioned upstream of the exit conduit; an insert comprising tapered walls including first and second ends, the first end defining an opening conformal to a first open end of the first housing member and adapted to be joined therewith, the second end defining a hollow sleeve of substantially the same size as the entrance conduit and adapted to sealingly mate therewith; thereby enclosing, in cooperation with the first compartment a tuner volume communicated with the tuner inlet passage; an air filter positioned upon the insert opening for filtering air; a second housing member sealingly engaging the first housing member and spaced from a portion of the air cleaner means to communicate air received from the inlet through the air cleaner means.

16 Claims, 2 Drawing Sheets

INTEGRATED AIR CLEANER ASSEMBLY

This application is a continuation of Ser. No. 07/395,164 filed on Aug. 15, 1989 now abandoned and Ser. No. 07/226,267 filed on July 29, 1988 now abandoned.

BACKGROUND AND SUMMARY OF THE INVENTION

The present invention relates to an air cleaner assembly and more particularly to an air cleaner which may include an integral resonator and mass airflow sensor.

Carburated engines typically included an air cleaner situated upstream of the carburetor. With the removal of the carburetor as typified by many of the fuel injected engines in use today, it has been found that the intake air as it enters the engine emits an annoying acoustical sound. In reality this noise most probably always existed with carbureted engines but due to the inherent throttle action of the narrowed carburetor venturi this noise was attenuated. One early solution to the noise problem was to include a resonator in series with the air cleaner, the exit end of the resonator being communicated to a throttle body of the injection system. This type of installation, while delivering clean air to the engine and attenuating engine noise, requires a serpentinelike placement of the above mentioned components. The installation of the air cleaner and resonator is further complicated by those systems which utilize a mass airflow sensor which must be positioned upstream of the throttle body or clean air intake of the engine.

It is an object of the present invention to provide an integral air cleaner resonator assembly. A further object of the present invention is to provide such an assembly which will act as an accumulator to decrease air intake back-flow pressure.

Accordingly the invention comprises: a filter assembly comprising: a first housing member comprising first and second compartments. The first compartment comprising an exit tube and an oppositely situated first open end. The exit tube comprising a plurality of radial inwardly extending stand-offs. The second compartment comprising an air inlet and an oppositely situated second open end. The assembly further includes means for sensing the mass of air exiting the exit tube including an exit conduit adapted to be received upon and supported by the stand-offs. The exit conduit and exit tube cooperate to form an inlet passage for a tuner or resonator. The mass airflow means further includes an entrance conduit, positioned upstream of the exit conduit. The assembly additionally includes an insert comprising tapered walls including first and second ends. The first end defining an opening conformal to the first open end of the first housing member and adapted to be joined therewith. The second end defining a hollow sleeve of substantially the same size as the entrance conduit and adapted to sealingly mate therewith, thereby enclosing in cooperation with the first compartment a tuner volume communicated with the tuner inlet passage. An air filter means may additionally be positioned upon the insert opening for filtering air. A second housing member is sealingly positioned in engagement with the first housing member and spaced from a portion of the air cleaner means to communicate air received from the inlet through the air cleaner means.

Many other objects and purposes of the invention will be clear from the following detailed description of the drawings.

DETAILED DESCRIPTION OF THE DRAWINGS

Figure 1:
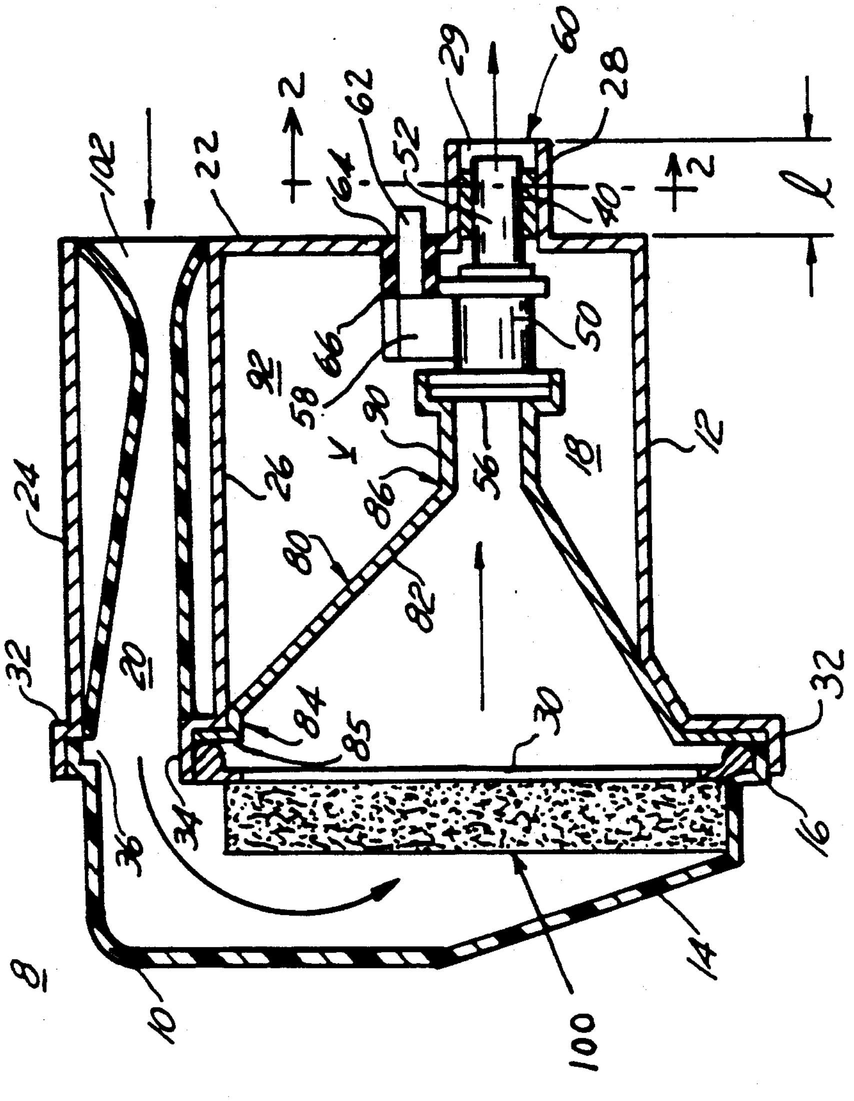
FIG. 1 diagrammatically illustrates an assembly constructed in accordance with the present invention.

FIG. 1 shows an air filter assembly 8 comprising a housing 10 having interconnected first and second housing members 12 and 14 respectively. As will be seen below, the second housing member operates as a cover for the first housing member. The first and second housing members are adapted to be joined together at location 16. The first housing member 12 includes the first and second compartments generally shown as 18 and 20. More particularly, the first housing member includes a bottom 22 and an extending wall 24 forming the exterior thereof and an interior wall 26 which serves to divide the housing into the first and second compartments 18 and 20. The bottom 22 includes a tubular extension or exit tube 28 defining an open end 29 which is adapted to be communicated to the clean air intake of the engine such as a throttle body via a hose or similar connection. The exterior wall 24 in cooperation with the wall 26 form an open end 30 of the first compartment 20. The ends of the walls 24 include a flanged shoulder 32. The end of the wall 26 also includes a flanged shoulder 34. The wall 24 in cooperation with wall 26 also cooperate to define the second open end 36 of the second compartment. As can be seen from FIG. 1, the second housing member 14 or cover is adapted to engage and seat upon the flanged shoulder 32.

Figure 2:
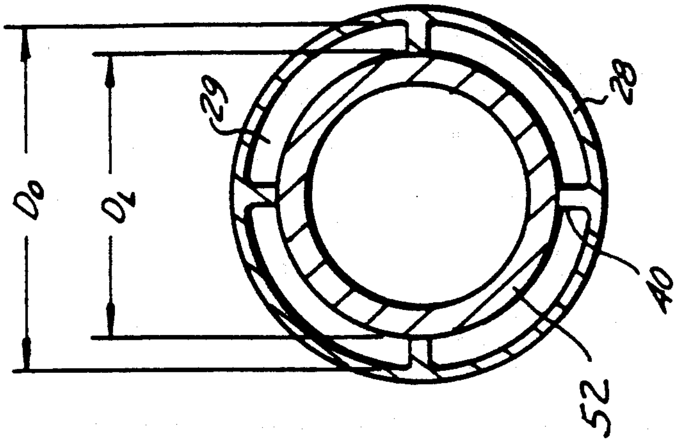
FIGS. 2 illustrates a cross-sectional view taken through sections 2—2 and of FIG. 1.

The exit tube 28 supports a plurality of radially inwardly extending stand-offs 40 as more particularly illustrated in FIG. 2. The assembly 8 may optionally include a mass airflow sensor generally illustrated as 50 for sensing the airflow exiting the exit tube 28 and for generating a signal indicative thereof. The mass airflow sensor 50 includes an exit conduit 52 adapted to be received upon and supported by the various stand-offs 40. The exit conduit 52 of the mass airflow sensor 50 and the exit tube 28 cooperate to form a tuner inlet 60. The mass airflow sensor 50 further includes an entrance conduit 56 positioned upstream of the exit conduit 52. The particular mass airflow sensor utilized in the assembly is of minor consequence. As an example, the mass airflow sensor 50 may be of the hot wire anemometer type such as that shown in U.S. Pat. No. 4,637,251, comprising a measurement passage parallel to a main passage formed within the entrance and exit conduits 56 and 52 respectively. Sensing electronics, generally shown as 58 are connected to the hot wires to generate a signal indicative of the mass flow of air in a known manner. The sensing electronics 58 may include a connector assembly 62 which is received through an opening 64 in the bottom 22 of the first housing member 12. In this manner the connector assembly 62 and opening 64 form a means for orienting the mass airflow sensor within the housing 10. Appropriate seals 66 may be placed about the connector assembly 62.

The assembly 8 further includes an insert 80 comprising tapered walls 82. The tapered walls extend from an open end 84 to a second end 86. The tapered walls proximate the open end 84 terminate in a radial flange 85 adapted to mate with the flanged shoulder 32 formed about the open end 34 of the first compartment. The second end 86 of the tapered walls join together to form a hollow sleeve 90 of substantially the same size as the entrance conduit 56 of the mass airflow sensor and are adapted to sealingly mate therewith. As can be seen, the insert in cooperation with the second compartment 20, as well as the exterior of the mass airflow sensor, cooperate to define a tuner volume 92. The tuner volume in cooperation with the tuner inlet passage are sized to resonate with or absorb acoustical noise of a predetermined frequency(s) to thereby diminish or eliminate same.

The relationships among the absorber frequency f, turner volume V and other dimensions of the resonator are related in the following aquations:

$$f = \frac{c}{2\pi} \sqrt{\frac{C_o}{v}}$$

$$C_o = \frac{\pi \, Req^2}{1 + \left(\frac{\pi}{2}\right) Req.}$$

$$Req = \sqrt{\frac{(Do^2 - (Di^2)}{4}}$$

It should be quite obvious from FIG. 1 that if the installation did not require a mass airflow sensor, the dimension of the hollow sleeve 90 may be extended such that it mates with and is supported by the standoffs 40. Positioned upon the flange 85 of the insert and supported by the flanged shoulder 32 of the first compartment is an air cleaner element generally designated as 100. The air cleaner element is sized to completely cover the open end 30 of the first compartment such that it is effective to filter all of the air input to the engine. As mentioned above, the second housing member functions as a cover and is adapted to seat upon the flanged shoulders 34 thereby enclosing the ends 30 and 36 of the first and second compartments respectively. In this manner, air received at the inlet 102 of the second compartment is communicated through the second compartment and directed by the cover 14 to flow through the air filter element 100.

In operation the exit tube 28 is communicated to the engine. Clean intake air is received at the inlet 102 of the housing 10 and filtered by the air cleaner element 100. The amount of air may optionally be measured by the mass airflow sensor 50, such air being communicated to the engine more specifically from the exit conduit 52 of the mass airflow sensor and exit tube 28. As the various cylinders of the engine move downwardly during the combustion process, a vacuum is created which sucks the intake air through the housing 10. It can be appreciated that this air is not in continuous flow but varies in accordance with the motion of the cylinders and as such the intake air will pulsate in accordance with the speed of the engine. At certain speeds of the engine, the intake air may cause an objectionable sound which propagates up through the clean air intake of the engine and if not attenuated produces a bothersome sound for the vehicle operator. This propagating air wave is received at the tuner inlet passage 60 and permitted to propagate into the tuner volume 92 wherein the sound is attenuated. The tuner inlet 60 and tuner volume 92 may be tuned to attenuate air at a specific frequency or tuned to overlap a plurality of frequencies. Further, as this air pulsing takes place a back pressure is created. This pulsing back pressure can distort the measuring accuracy of the mass airflow sensor. It is through that in this invention that the tuner volume 92 in conjuction with the tuner inlet 60 will act as an accumulator such that the back pressure pulses will be absorbed by the tuner volume.

Figure 3:
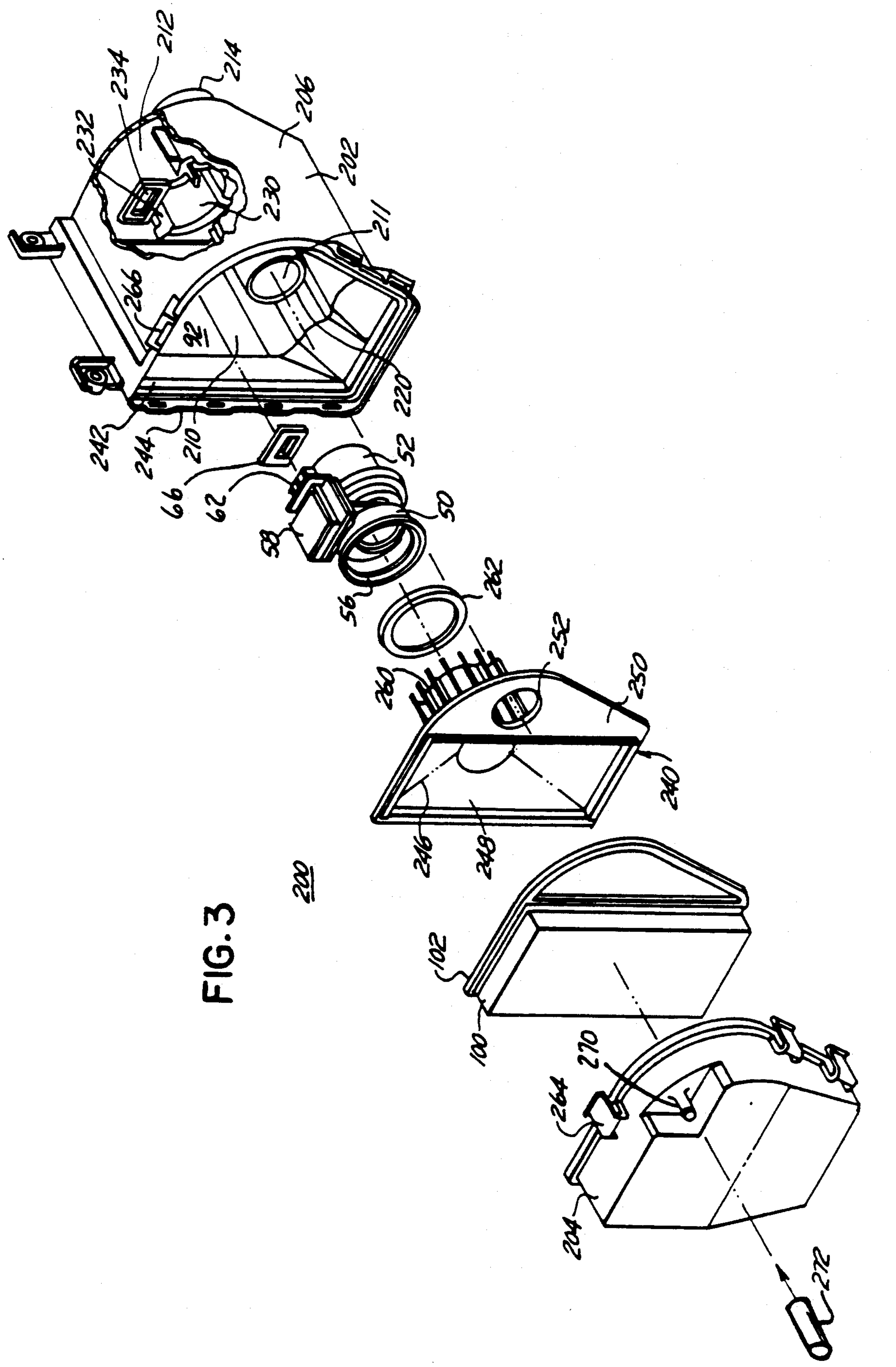
FIGS. 3 illustrate an assembly drawing of an alternate embodiment.

FIG. 3 is an assembly view of an assembly similar to that illustrated in FIG. 1 and shows first and second housing members 202 and 204 respectively. As will be seen below, the second housing member 204 operates as a cover for the assembly 200. The first and second housing members are adapted to be joined together. The second housing member 204 or cover is adapted to enclose the assembly 200 by engagement with the flanged shoulder 244 of the first housing member. Fasteners such as 264 may be provided as part of the cover and adapted to mate with engagement surfaces 266 formed as part of the first housing member.

The cover 204 may further include a tube 270 which extends through a surface thereof. The tube 270 may be optionally provided and adapted to communicate with the positive crankcase ventilation (PCV) line 272.

The first housing member 202 comprises first and second chambers or compartments generally shown as 210 and 211. More particularly, the first housing member includes a bottom 212 and an axially extending wall 206 forming the exterior thereof. Extending through the end or bottom of the first housing member is a cylinder 214. The volume internal to the cylinder 214 defines another chamber 211, designated as the second compartment of the first housing. The bottom includes a tubular extention or exit tube 230 which is adapted to be communicated to the clean air intake of the engine such as a throttle-body via a hose or similar connection. The assembly 200 includes a mass airflow sensor generally illustrated as 50 for sensing the airflow exiting the exit tube and for generating a signal indicative thereof. Situated about the exit tube 230 are a plurality of stand-offs 232 (such as 40 of FIG. 1) adapted to receive an exit conduit 52 of the mass airflow sensor 50. The exit conduit 52 of the mass airflow sensor 50 and the exit tube 230 cooperate to form a resonator/tuner inlet 60. The mass airflow sensor 50 further includes an entrance conduit 56 positioned upstream of the exit conduit 52. The mass airflow sensing electronics 58 may include a connector assembly 62 which is received through an opening 234 in the bottom 212 of the first housing member 202. In this manner the connector assembly 62 and opening 234 form a means for orientating the mass airflow sensor within the first housing member 202. Appropriate seals 262 may be placed about the connector assembly.

The assembly 200 further includes an insert 240 comprising tapered walls 246. The tapered walls extend from an open end 248 to one end of an extending passage 260. The tapered insert 240 is adapted to be received upon the flanged shoulders 242 defined about the open end 244 of the first housing member 202. The opening 248 of the insert is smaller than the opening 244 of the first housing member. The insert 240 includes a radially extending wall 250 having formed therein an opening 252 such that when the insert is positioned upon the first housing member, the interior end 220 of the cylinder 214 extends therethrough. The insert 240 further includes the axially extending passage 260 adapted to receive the entrance conduit 56 of the mass airflow sensor 50. Appropriate sealing such as 262 may be provided therebetween. As can be seen, the insert in cooperation with the first compartment 210, as well as the exterior of the mass airflow sensor, cooperate to defined a tuner or resonator volume. When the insert is in place, the wall 250 thereof also serves to enclose a portion of the resonator volume 92. The tuner volume in cooperation with the tuner inlet passage are sized to resonate with or absorb acoustical noise of a predetermined frequency(s) to thereby diminish or eliminate same.

The operation of the assembly 200 illustrated in FIG. 4 is substantially identical to the operation of the assembly 10 illustrated in FIG. 1.

Many changes and modifications in the above described embodiment of the invention can, of course, be carried out without departing from the scope thereof. Accordingly, that scope is intended to be limited only by the scope of the appended claims.

I claim:

1. An assembly comprising:
- a first housing member comprising
  - first and second compartments, the first compartment comprising an exit ,tube and an oppositely situated first open end, the second compartment comprising an air inlet and an oppositely situated second open end, the exit tube comprises a plurality of radial inwardly extending stand-offs;
  - means for sensing the mass of air exiting the exit tube, including an exit conduit adapted to be received upon and supported by the stand-offs;
  - the exit conduit and exit tube cooperating to form a tuner inlet passage, the mass airflow sensing means further including an entrance conduit, positioned upstream of the exit conduit;
- an insert comprising tapered walls, including first and second ends, the first end defining an opening conformal to the first open end of the first housing member and adapted to be joined thereto, the second end defining a hollow sleeve of substantially the same size as the entrance conduit and adapted to sealingly mate therewith; thereby enclosing, in cooperation with the first compartment a tuner volume, communicated with the tuner inlet passage;
  - air filter means positioned upon the insert opening for filtering air;
  - a second housing member sealingly engaging the first housing member and spaced from a portion of the air cleaner means to communicate air received from the inlet to the air cleaner means.

2. The assembly as defined in claim 1 wherein the mass airflow means includes an electrical connector and wherein the first housing member, in the first compartment includes an aperture for receiving the electrical connector such that when the electrical connector is received into the aperture the mass airflow sensing means is positioned in a preferred orientation.

3. The assembly as defined in claim 1 wherein the second compartment is cylindrical and formed by a cylindrical intake duct extending through the first compartment.

4. The assembly as defined in claim 3 wherein a first end of the insert comprises a flange, offset from the insert opening, defining a flange opening such that where the insert is positioned upon the first housing member the flange opening receives an end of the cylindrical intake duct.

5. The assembly as defined in claim 4 wherein the second housing member includes an air inlet tube.

6. The assembly as defined in claim 5 wherein the inlet tube is adapted to be communicated to a positive crankcase ventilation line of an engine.

7. The assembly as defined in claim 6 wherein the second housing member includes snap fasteners adapted to engage corresponding portions on the first housing members for securement thereto.

8. The assembly as defined in claim 1 wherein the tuner volume is a pressure accumulator.

9. A filter assembly comprising:
- a first housing member comprising
  - first and second compartments, the first compartment comprising an exit tube and an oppositely situated first open end, the second compartment comprising an air inlet and an oppositely situated second open end, the exit tube comprises a plurality of radial inwardly extending stand-offs;
  - an insert comprising tapered walls including first and second ends, the first end defining an opening conformal to the first open end of the first housing member and adapted to be joined thereto, the second end defining a hollow sleeve defining an exit conduit adapted to be received upon the stand-offs, thereby enclosing, in cooperation with the first, compartment a tuner volume V, communicated with a tuner inlet passage;
  - air filter means positioned upon the insert opening for filtering air;
  - a second housing member sealingly engaging the first housing member and spaced from a portion of the air cleaner means to communicate air received from the inlet to the air cleaner means.

10. The assembly as defined in claim 9 wherein the second compartment is cylindrical and formed by a cylindrical intake duct extending through the first compartment.

11. The assembly as defined in claim 10 wherein a first end of the insert comprises a flange, offset from the insert opening, defining a flange opening such that where the insert is positioned upon the first housing member the flange opening receives an end of the cylindrical intake duct.

12. The assembly as defined in claim 11 wherein the second housing member includes an air inlet tube.

13. The assembly as defined in claim 12 wherein the inlet tube is adapted to be communicated to a positive crankcase ventilation line of an engine.

14. The assembly as defined in claim 13 wherein the second housing member includes snap fasteners adapted to engage corresponding portions on the first housing members for securement thereto.

15. The assembly as defined in claim 9 wherein the tuner volume is a pressure accumulator.

16. A noise attenuating air filter assembly for an engine comprising:
- a housing containing a generally U-shaped passage means having first and second parallel passages that are side-by-side each other;
- said first passage containing the air inlet and said second passage containing the air outlet, said air inlet and air outlet being at the same end of the housing;

an air filter element disposed in said housing between said first and second passages;

an insert within said second passages comprising a first end wall of said insert opposite said air outlet being a frusto-conical wall portion of said second passage, and a second end defining a hollow sleeve;

means including an exit conduit for exiting air from said insert to said air outlet, said means adapted to sealingly mate with said hollow sleeve;

supporting means for supporting said exit conduit in said air outlet;

a resonating chamber within said housing surrounding said insert, said resonating chamber being enclosed except at an entrance thereto, said entrance being in common with said air outlet and said exit conduit.

* * * * *